Patented May 12, 1936

2,040,145

UNITED STATES PATENT OFFICE 2,040,145

β-METHYLCHOLINE DERIVATIVES AND SALTS AND PROCESSES FOR THEIR PRODUCTION

Randolph T. Major, Mountainside, and Joseph K. Cline, Woodbridge, N. J., assignors to Merck & Co., Inc., Rahway, N. J., a corporation of New Jersey No Drawing. Application August 12, 1932, Serial No. 628,549

2 Claims. (Cl. 260—25)

This invention relates to the production of salts of β-methylcholine and esters of β-methylcholine.

A study of the art reveals that the true β-methylcholine has not been produced hitherto, although the literature does contain references to α-methylcholine and β-methylcholine, but there appears to be considerable disagreement as to the properties of compounds which have been previously produced. The prior investigators are not at all in accord as to which isomer they have obtained, even when they use the same general method of preparation.

Menge (J. Biol. Chem. 10, 400 [1911]) prepared a compound which he called "α-methylcholine", and which was supposed to have the formula $(CH_3)_3NClCHCH_3CH_2OH$.

Karrer (Helv. Chim. Acta, 5, 477 [1922]) described a preparation of an "α-methylcholine" which had entirely different properties from Menge's.

The preparation of a so-called "β-methylcholine" was first described by Malengreau and Lebailly (Z. physiol. Chem., 67, 40 [1910]), but the properties of this preparation are very much like those of Menge's "α-methylcholine".

Berlin (Z. Biol., 57, 15, 24 [1911]) obtained a compound which he called "β-methylcholine", which had different properties from those ascribed to it by Malengreau and Lebailly.

In general, the results of our investigation have established that only true α-methylcholine has been made, and this by the process described by Karrer, and that the so-called "β-methylcholines" hitherto described have probably been at most mixtures of the two isomers.

Recent pharmacological work has shown that derivatives of pure β-methylcholine are especially adapted for treatment of certain disorders of the heart and circulation, and their preparation has now been accomplished by us. The process for carrying out this invention in a preferred form consists essentially in the preparation of trimethylacetonylammonium chloride, $(CH_3)_3N(Cl)CH_2COCH_3$, or other convenient or adaptable salt, and the catalytic reduction thereof with hydrogen. The process in detail will be set forth in a preferred form for its application in the following example:

*Example I.*—Five grams of trimethylacetonylammonium chloride in 25 cc. of absolute alcohol are catalytically reduced in the presence of 0.1 g. of platinum oxide (Adams) which is prepared according to the method described by Adams and Shriner in the Journal of the American Chemical Society, volume 45, p. 2171, for 1923, and one drop of a normal solution of ferric chloride in water. After the theoretical amount of hydrogen has been absorbed, the solution is filtered from the platinum and all the alcohol evaporated in vacuo. The oil that remains is kept in a vacuum desiccator for three days, during which time it is all crystallized. The solid is dissolved in absolute alcohol which has previously been saturated with hydrogen sulfide. The small amount of iron sulfide which precipitates is removed by shaking the solution with activated charcoal. The β-methylcholine chloride is precipitated as an oil from the filtrate of the mixture by the addition of dry ether. The ether layer is decanted and the oil repeatedly washed with small portions of dry ether until crystallization starts. The product is then further purified by recrystallization from a small amount of dry butyl alcohol. It appears in the form of white hygroscopic needles, soluble in water and alcohol, but insoluble in ether; M. P. 165° C.

Anal. Calcd. for $C_6H_{16}ONCl$: N, 9.13; Cl, 23.10. Found: N, 9.23, 9.37; Cl, 23.15.

Acylated derivatives of these new β-methylcholine preparations have also been produced and have been found to be suitable for similar therapeutic uses. The acylation of these compounds is carried out in the manner shown in Example II, wherein the acylation is exemplified in terms of acetic anhydride, by using the appropriate acid anhydride to the desired end product, and correspondingly adapting physical requirements.

*Example II.*—Acetylation of β-methylcholine chloride.—A mixture of one molecular portion of β-methylcholine chloride and seven molecular portions of acid anhydride is heated at 100° C. for three to six hours. Dry ether is then added to the cooled solution. The precipitate which forms is washed several times with ether, and then dissolved in absolute alcohol. This solution is first decolorized with activated charcoal, and then the acetylated compound reprecipitated by the addition of dry ether. The products thus obtained are white hygroscopic solids readily soluble in water.

Acetyl β-methylcholine chloride melts at 172–173° C. Anal. Calcd. for $C_8H_{18}O_2NCl$: C, 49.00, H, 9.20, Cl, 18.15. Found: C, 49.14, H, 9.29, Cl, 17.97.

By modifying the process of Example II, by using propionic anhydride instead of acetic anhydride, the homologous propionyl compound is obtained.

Propionyl β-methylcholine chloride: Anal. Calcd. for $C_9H_{20}O_2NCl$: N, 6.68. Found: N, 6.54.

The foregoing examples which are set forth as preferred and efficient means for applying these processes and producing the products of this invention are described by way of illustration and not of limitation, and may obviously be modified in certain particulars without departing from the scope and purposes of the present invention.

What we claim as new, and on which we pray the issuance of Letters Patent, is:—

1. β-methylcholine chloride substantially free from the alpha isomer.

2. The process of making β-methylcholine chloride involving the catalytic reduction of trimethylacetonylammonium chloride by hydrogen.

RANDOLPH T. MAJOR.
JOSEPH K. CLINE.